(12) United States Patent
Mandell

(10) Patent No.: US 6,746,118 B2
(45) Date of Patent: Jun. 8, 2004

(54) BIFOCAL CONTACT LENS WITH SECONDARY PRISM

(75) Inventor: Robert B Mandell, Moraga, CA (US)

(73) Assignee: Soft Focal Company, Inc., Moraga, CA (US)

( * ) Notice: Subject to any disclaimer, the term of this patent is extended or adjusted under 35 U.S.C. 154(b) by 375 days.

(21) Appl. No.: 09/908,296

(22) Filed: Jul. 17, 2001

(65) Prior Publication Data

US 2003/0016331 A1 Jan. 23, 2003

(51) Int. Cl.[7] .................................................. G02C 7/04
(52) U.S. Cl. ....................................... 351/161; 351/177
(58) Field of Search .......................... 351/160 H, 160 R, 351/161, 162, 177

(56) References Cited

U.S. PATENT DOCUMENTS

| | | | |
|---|---|---|---|
| 3,597,055 A | 8/1971 | Neefe | 351/161 |
| 3,684,357 A | 8/1972 | Tsuetaki | 351/161 |
| 4,095,878 A | 6/1978 | Fanti | 351/161 |
| 4,268,133 A | 5/1981 | Fischer | 351/161 |
| 4,318,595 A | 3/1982 | Van der Kolk | 351/160 |
| 4,324,461 A | 4/1982 | Salvatori | 351/160 |
| 4,549,794 A | 10/1985 | Loshaek | 351/161 |
| 4,573,774 A | 3/1986 | Sitterle | 351/160 |
| 4,573,775 A | 3/1986 | Bayshore | 351/161 |
| 4,614,413 A | 9/1986 | Obssuth | 351/161 |
| 4,618,229 A | 10/1986 | Jacobstein | 351/161 |
| 4,636,049 A | 1/1987 | Blacker | 351/161 |
| 4,752,123 A | 6/1988 | Blacker | 351/161 |
| 4,850,689 A | 7/1989 | Martin | 351/161 |
| 4,854,089 A | 8/1989 | Morales | 51/284 R |
| 4,869,587 A | 9/1989 | Breger | 351/161 |
| 5,074,082 A | 12/1991 | Cappelli | 51/284 |
| 5,141,301 A | 8/1992 | Morstad | 351/161 |
| 5,245,366 A | 9/1993 | Svochak | 351/161 |
| 5,296,880 A | 3/1994 | Webb | 351/161 |
| 5,430,504 A | 7/1995 | Muckenhirn | 351/161 |
| 5,517,260 A | 5/1996 | Glady | 351/169 |
| 5,635,998 A | 6/1997 | Baugh | 351/161 |
| 5,754,270 A | 5/1998 | Rehse | 351/161 |
| 5,760,870 A | 6/1998 | Payor | 351/160 |
| 5,864,379 A | 1/1999 | Dunn | 351/161 |
| 5,912,719 A | 6/1999 | Baude et al. | 351/160 R |
| 6,109,749 A | 8/2000 | Bernstein | 351/161 |

FOREIGN PATENT DOCUMENTS

EP 0042023 6/1980

OTHER PUBLICATIONS

Ezekiel, A Soft Bifocal Lens, 2002, Spectrum Ruben, Guillon, Contact Lens Practice, 1994.

Ruben, M. and Guillon, M. *Contact Lens Practice*, Chapman and Hall Medical, London, 1994, pp. 811–822.

Mandell, R., *Contact Lens Practice*, 4th ed. Springfield, C. thomas, 1988, pp. 809–814.

Norman, C.W. and Lotzkat, –U., "A soft approach to presbyopia", Spectrum, Aug. 1995, pp. 27–32.

Forst, B. "Investigations into the stabilization of bifocal contact lenses", Int. Contact Lens Clinic, 14(2):1987, pp. 68–74.

Bierly, J. R. et al, "A quantitative and qualitative assessment of the solitaire bifocal contact lens", CLAO Journal, 21(1):1995, pp. 20–23.

Burris, G.M., "Presbyopic retrospective: a ten–year study", Spectrum, Apr., 1993, pp. 56–59.

Conklin, J.D. et al, "An evaluation of four multifocal contact lenses in young monocular aphakic patients", CLAO Journal, 18(2):1994, pp. 92–94.

*Primary Examiner*—Scott J. Sugarman

(57) ABSTRACT

A soft prism bifocal contact lenses that provides optimal vision for both distance and near objects by incorporating two or more prisms into the same lens. One or more primary prisms are used to achieve a desired vertical lens positioning on the eye and to control meridional rotation. In addition, one or more secondary prisms are used to achieve vertical lens shifting so that the desired optical power zone of the contact lens is brought before the entrance pupil of the eye at the desired time.

16 Claims, 10 Drawing Sheets

BIFOCAL CONTACT LENS WITH SECONDARY PRISM

CROSS REFERENCES

NONE

FEDERAL SUPPORT

NONE

BACKGROUND OF THE INVENTION

1. Field of Invention

This invention relates generally to contact lenses, particularly to a bifocal contact lens in which at least one primary prism and one secondary prism are present.

2. Prior Art

Bifocal contact lenses are lenses comprised of two or more areas with different optical powers, often referred to as zones. A far-power zone provides the optical power for a wearer's distance vision and a near-power zone, sometimes called a segment, provides the optical power for a wearer's near vision. The two zones may be subdivided into additional zones of different powers or combined into a variable power zone, in which case a bifocal contact lens may also be called a multifocal lens as in U.S. Pat. Nos. 5,517,260 and U.S. Pat. No. 5,754,270, but the same principles described as follows will apply.

The retinal image and the visual percept that results from it are dependent upon the light that enters the eye through the entrance pupil. In order for a bifocal contact lens to function properly the entrance pupil must be covered at least partly or, more effectively, completely by the far-power zone of the lens when the eye observes a distant object and covered at least partly or, more effectively, completely by the near-power zone of the lens when the eye observes a near object. This function can be accomplished by the principle of alternating vision in which a vertical shifting action or translation of the contact lens is made to occur in order to place one or the other zone in front of the entrance pupil as the eye alternates between viewing distance and near objects (Mandell, 1988; Ruben and Guillon, 1994).

Alternatively, a principle known as simultaneous vision can be utilized whereby the contact lens is designed and fitted in such a way as to position part or all of both the far and near-power zones in front of the entrance pupil at the same time so that each contributes to the retinal image simultaneously. In the latter case the lens requires little or no vertical shifting action. Simultaneous vision has the drawback, however, that two images are seen at once and at least one of the two retinal images formed by light from the distance and near zones is always out of focus so that vision is compromised (Mandell, 1988; Ruben and Guillon, 1994).

Bifocal contact lenses generally are classified into two types, segmented and concentric. Segmented bifocal contact lenses have two or more vertically separated power zones that function usually but not always by the alternating vision principle as described in U.S. Pat. Nos. 3,597,055 and 3,684,357. Concentric bifocal contact lenses have a central power zone and one or more annular power zones that function usually, but not always, by the simultaneous vision principle., as described in U.S. Pat. Nos. 4,636,049: 4,752,123, 4,869,587 and 5,864,379. The far and near-power zones, together with optional transition curves, comprise the bifocal area. The remainder of the lens surface is comprised of one or more options that are used to complete the lens shape, such as lenticular curves, truncations, slab off, and various edge contours.

There are several subtypes of segmented bifocal contact lenses, based on the shape of the near-power zone, including round, D-shaped, flat, crescent, and others as described by Conklin Jr. et al, 1992 and in U.S. Pat. No. 5,074,082. The near-power zone is usually placed at the lower portion of the lens and maintained in that position by various features that can be incorporated into the lens in an attempt to control the lens position and stabilize the meridional rotation as described in U.S. Pat. Nos. 4,095,878; 4,268,133; 5,760,870; 5,296,880; and 4,573,775. This is commonly accomplished in rigid bifocal contact lenses by incorporating a prism into the lens, in which case the lower part of the lens is relatively thick and the upper part relatively thin. The prism serves to maintain the desired lens orientation and keep the near-power zone of the lens downward, as described in U.S. Pat. Nos. 5,430,504 and 4,854,089 and in Burris, 1993; Bierly, 1995, and Conklin Jr. et al, 1992.

In rigid prism bifocal contact lenses the lower edge of the lens tends to rest on the upper margin of the lower lid. When the wearer views a distant object the far-power zone ideally is positioned to cover the entrance pupil of the eye, and the near-power zone is positioned below the entrance pupil by gravity and the downward force of the upper lid (Forst, 1987). For reading or other near-vision tasks, the eye rotates downward and the contact lens ideally shifts upward relative to the eye, moving the near-power zone to a position in front of at least part of the entrance pupil in order to provide an optical correction for near vision.

Attempts have been made to design a soft prism bifocal contact lens that has a construction similar to that used in rigid lenses. However, soft bifocal contact lenses are much larger that rigid contact lenses, usually between 13 and 15 mm, and often extend beyond the limbus of the eye. When a soft prism bifocal contact lens is worn, the thicker portion of the lens moves downward and lies beneath the lower lid. As a result, the lens is not supported or braced by the upper margin of the lower lid. Hence, the prism component is successful in moving a soft prism bifocal contact lens to the desired low position and controlling meridional rotation but is not successful in inducing a vertical lens shift as the eye looks back and forth between distant and near objects.

Despite some early reports of successes, present soft prism bifocal contact lenses do not have sufficient vertical shifting action to fulfill the alternating vision principle and thus do not provide acceptable vision for both distance and near viewing (Mandell, 1988; Ruben and Guillon, 1994). Several prism bifocal soft contact lenses have been developed and brought to the marketplace, only to be later discontinued. Soft contact lenses of this type have been described in U.S. Pat. Nos. 4,549,794; 5,635,998; 5,635,998; 4,618,229; and 5,141,301. To the best of my knowledge, there is no soft bifocal contact lens that functions by the alternating vision principle and provides optimal vision.

Most soft bifocal contact lenses that are available today are of the concentric bifocal type and operate on the principle of simultaneous vision (Norman, 1995; Burris, 1993). It is recognized that these lenses do not provide good vision for both distance and near viewing and are only worn successfully by those who are willing to accept less than optimal vision.

Attempts have been made to induce a vertical shift of a soft bifocal contact lens by adding features to the lower periphery of the lens. U.S. Pat. No. 6,109,749 describes a soft bifocal contact lens that has an integrally formed bevel to aid translation of the lens. The bevel portion has upper and lower shoulders which converge to form an extended bevel. The bevel does not form part of the optical portion of the lens. This lens may have a single prism incorporated into the structure. U.S. Pat. No. 5,635,998 shows a multifocal contact lens that has an ellipsoidal shape and a single prism, which in combination produce an elongated zone of contact between the base portion of the prism and the lower eyelid. U.S. Pat. No. 5,912,719 and European Pat. No. 0 042 023 show lenses that are comprised of palpebral (lid) bosses projecting locally from the external surface in the peripheral area, where each palpebral boss is globally elongate in a circumferential direction and with a crest line of limited dimensions. The crest line has a peak in its middle area. U.S. Pat. No. 4,614,413 describes a lens with a lenticular carrier which serves as a palpebral anchor.

Previous contact lenses have been made that contained more than one prism but for the purpose of accomplishing a smooth transition between the distance and near zones in the bifocal area. U.S. Pat. No. 4,854,089 describes a bifocal contact lens in which a first prism component is incorporated into the base curve and a second prism component is incorporated into the distance vision curve. The second prism is not designed so as to enhance lens shifting or translation and does not extend forward at the base of the second prism in order to contact the lower lid and increase the function of lens shifting.

SUMMARY OF THE INVENTION

The vertical shifting deficiency in previous soft prism bifocal contact lenses is corrected in my invention by incorporating two or more prisms into the same lens, which operate together but with different structure and function. One or more primary prisms provide a desired lens vertical positioning on the eye during distance viewing and control meridional rotation in the plane of the corneal perimeter, the limbus. In addition, one or more secondary prisms with bases that extends forward from the adjacent lens surface provide vertical lens shifting, a translation movement, so that the desired optical power zone of the contact lens is moved in front of the entrance pupil of the eye at the desired time. The lens usually contains a segmented bifocal area on one surface in which the far-power zone of the lens is uppermost and the near-power zone lowermost in position but a concentric bifocal may be used as can any other bifocal construction for which a shifting or translational movement of the contact lens on the eye will change the power effect within the bifocal area.

OBJECTS AND ADVANTAGES

It is an object of my invention to provide a soft bifocal contact lens that will give optimal vision to the wearer for viewing both distance and near objects as the result of improved lens shifting.

It is a further object of my invention to make a bifocal contact lens of soft or flexible materials so as to provide maximum comfort to the wearer.

It is a further object of my invention to provide a soft bifocal contact lens that will take advantage of the anatomical structure of the eye and lids for purposes of initiating a vertical shifting or translational movement, so as to provide one or another optical power to the eye at the desired time.

It is a further object of my invention to provide a bifocal contact lens that will have better image forming properties than that of previous soft bifocal contact lenses.

It is a further object of my invention to provide a soft bifocal contact lens that is relatively inexpensive to manufacture using standard lathing or molding techniques.

It is a further object of my invention to expand the number of patients who are able to wear bifocal contact lenses The advantage of my soft bifocal contact lens is to provide the wearer optimal vision for both distance and near vision with good comfort.

Further objects and advantages of my invention will become apparent from a consideration of the drawings and ensuing description.

DETAILED DESCRIPTION OF THE INVENTION

In the descriptions that follow my invention is illustrated as though a contact lens is divided into separate components which comprise the refractive power, primary prisms and secondary prisms, as may be done in lens design. This allows identification of the components of my invention but in practice the components are combined into a single lens construction that is indivisible.

Figure 1:
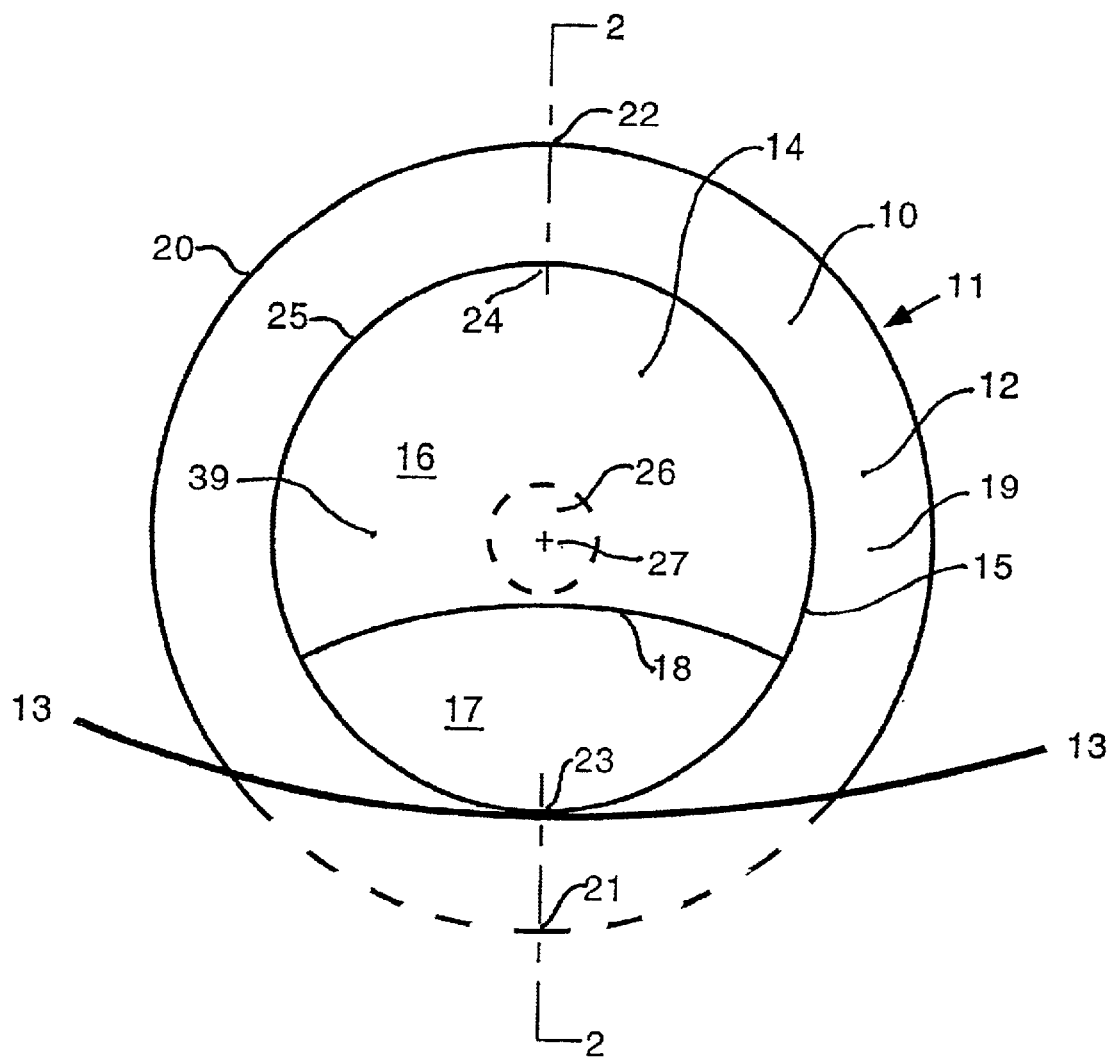
FIG. 1 is a front plan view of a bifocal contact lens in accordance with my invention, which is shown in a position for distance viewing.

FIG. 1 is a plan view of a front surface 10 of a bifocal contact lens 11, in accordance with my invention, having a primary prism 12 that encompasses all of contact lens 11, and a secondary prism 14 limited by perimeter 15. Front surface 10 is comprised of a bifocal area 39 with far-power zone 16 above near-power zone 17 and separated by a junction 18. Bifocal area 39 is surrounded by lenticular area 19 extending to edge perimeter 20. Primary prism 12 has a base 21 and an apex 22 on edge perimeter 20 at points along a midline 2. Secondary prism 14 has a base 23 and an apex 24 along midline 2 and which also lie on a perimeter 25 of bifocal area 39. Bifocal area 39 also coincides with the area of secondary prism 15. An entrance pupil 26 of the eye is behind part of far-power zone 16 and centered with respect to a geometric center 27 of lens 11. Lens 11 is in a position relative to the upper margin of lower lid 13 for a wearer to see distant objects clearly and near-power zone 17 will not interfere with distance vision.

Figure 2:
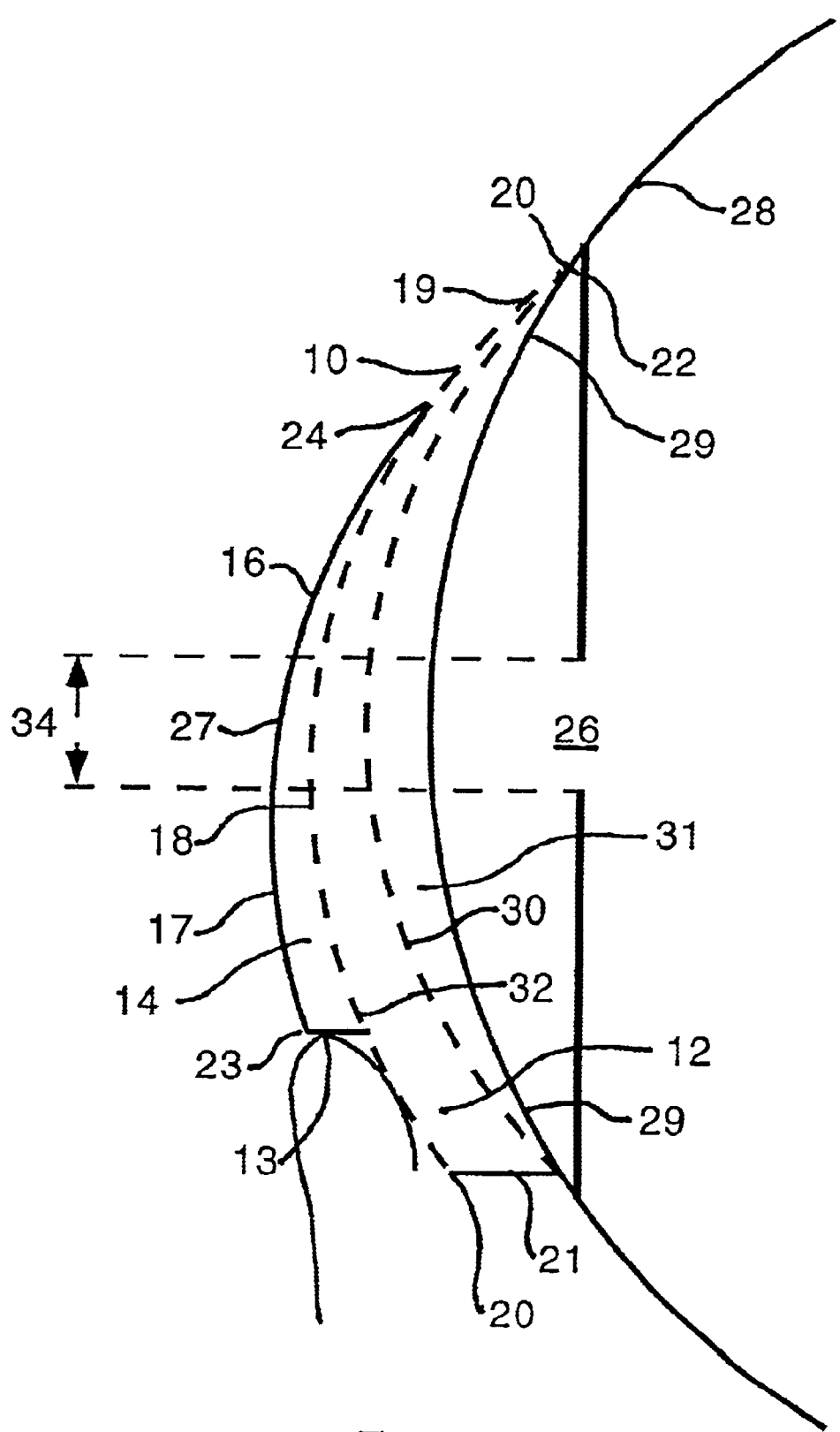
FIG. 2 is a cross-sectional view of the lens of FIG. 1.

FIG. 2 is a cross-sectional view of contact lens 11 of FIG. 1 in a plane passing through construction midline 2 and showing a spherical portion 31, primary prism 12, and secondary prism 14 in relation to eye 28 and limbus 29. As stated, front surface 10 is comprised of bifocal area 39 with far-power zone 16 and near-power zone 17 separated by junction 18. Bifocal area 39 is surrounded by lenticular area 19 extending to edge perimeter 20. Primary prism 12 has base 21 and apex 22 on edge perimeter 20. Secondary prism 14 has base 23 and apex 24. Entrance pupil 26 is behind part of distance zone 16 and centered with respect to geometric center 27 of the lens. The theoretical front surface of spherical component 31 is shown by phantom line 30 and the theoretical front surface of primary prism 12 is shown by phantom line 32. A bundle of light rays 34 is limited by entrance pupil 26. The margin of lower lid 13 is in contact with base 23 of secondary prism 14.

Figure 3:
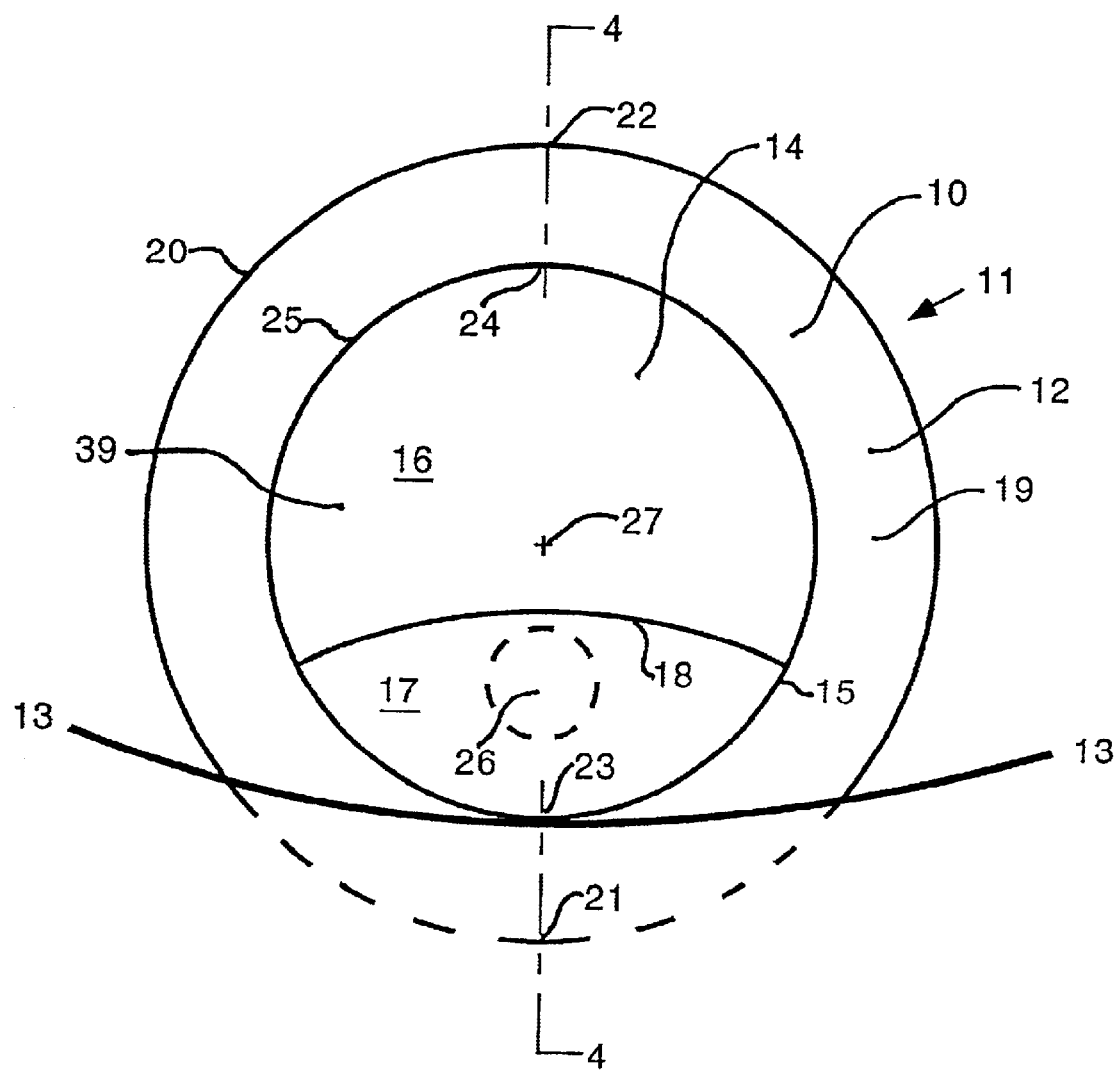
FIG. 3 is a front plan view of the bifocal contact lens of FIG. 1 in a position for near viewing.

FIG. 3 is a plan view of contact lens 11 of FIG. 1 after the eye has turned downward to view near objects. Near-power zone 17 lies in front of entrance pupil 26 and base 23 of secondary prism 14 lies on margin of lower lid 13.

Figure 4:
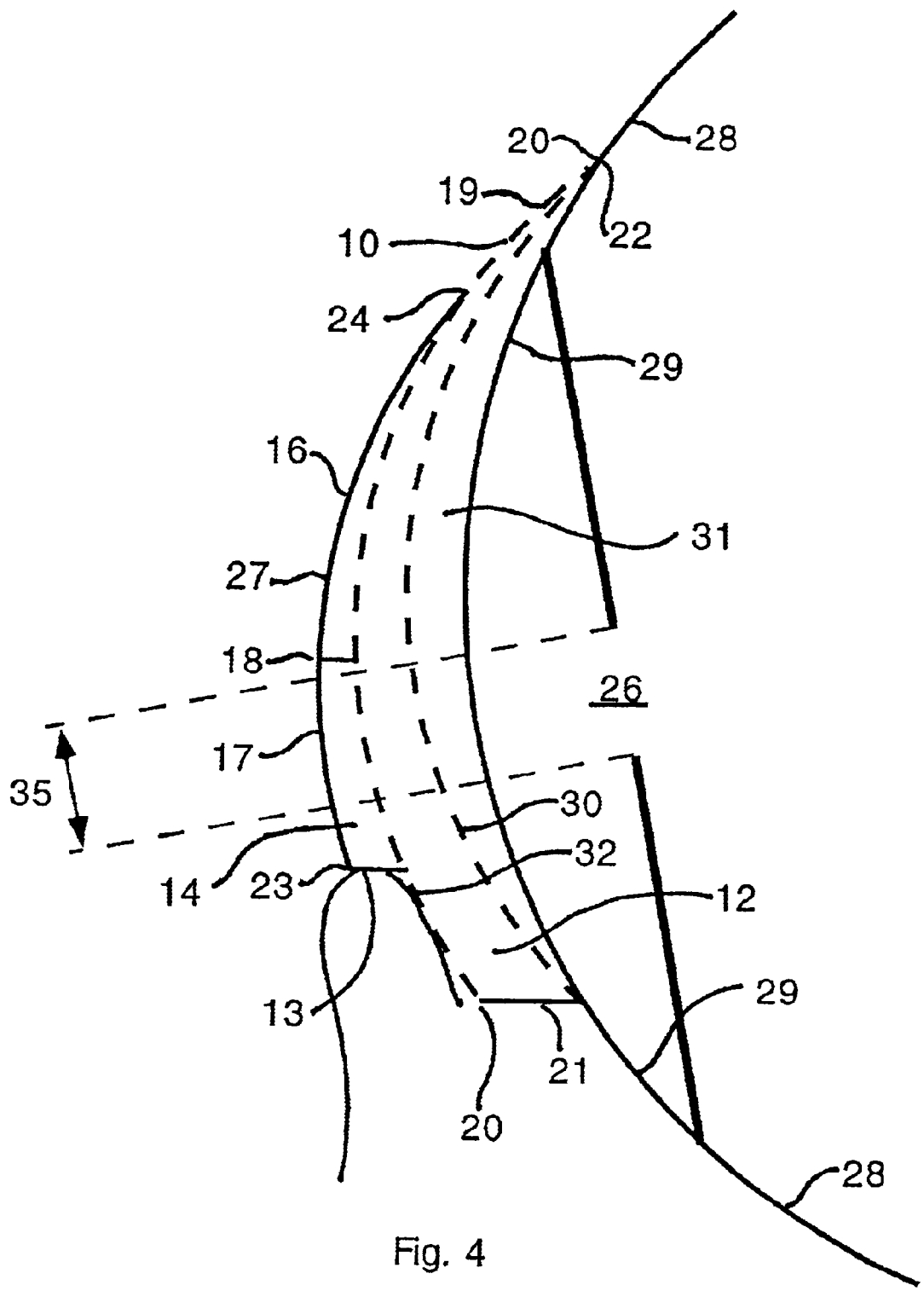
FIG. 4 is cross-sectional view of the bifocal contact lens of FIG. 1 in a position for near viewing.

FIG. 4 is a cross-sectional view of contact lens 11 of FIG. 1 in a plane passing through midline 2 after the eye has turned downward as in FIG. 3. Near-power zone 17 lies in front of entrance pupil 26 and base 23 of secondary prism 14 lies on margin of lower lid 13. An upward shift of contact lens 11, allows a bundle of light rays 35 from a near object to pass through near-power zone 17 of bifocal area 39 so that a wearer may see near objects clearly.

Figure 5:
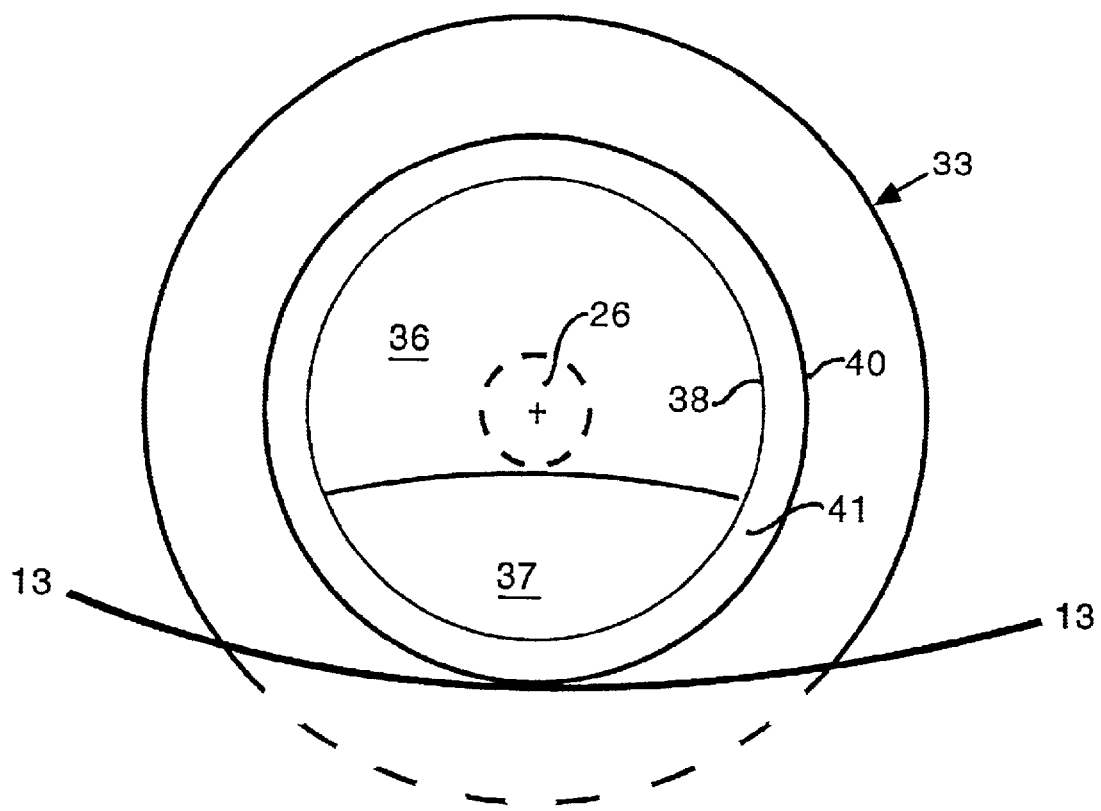
FIG. 5 is a front plan view of a bifocal contact lens in accordance with my invention, which has a bifocal area that is smaller than the secondary prism.

FIG. 5 is a front plan view of a bifocal contact lens 33, in accordance with my invention, in which a far-power zone 36 and a near-power zone 37 together comprise a bifocal area with a perimeter 38 that is smaller than a perimeter 40 of a secondary prism 41. Entrance pupil 26 is situated behind far-power zone 36 in a position to view distant objects.

Figure 6:
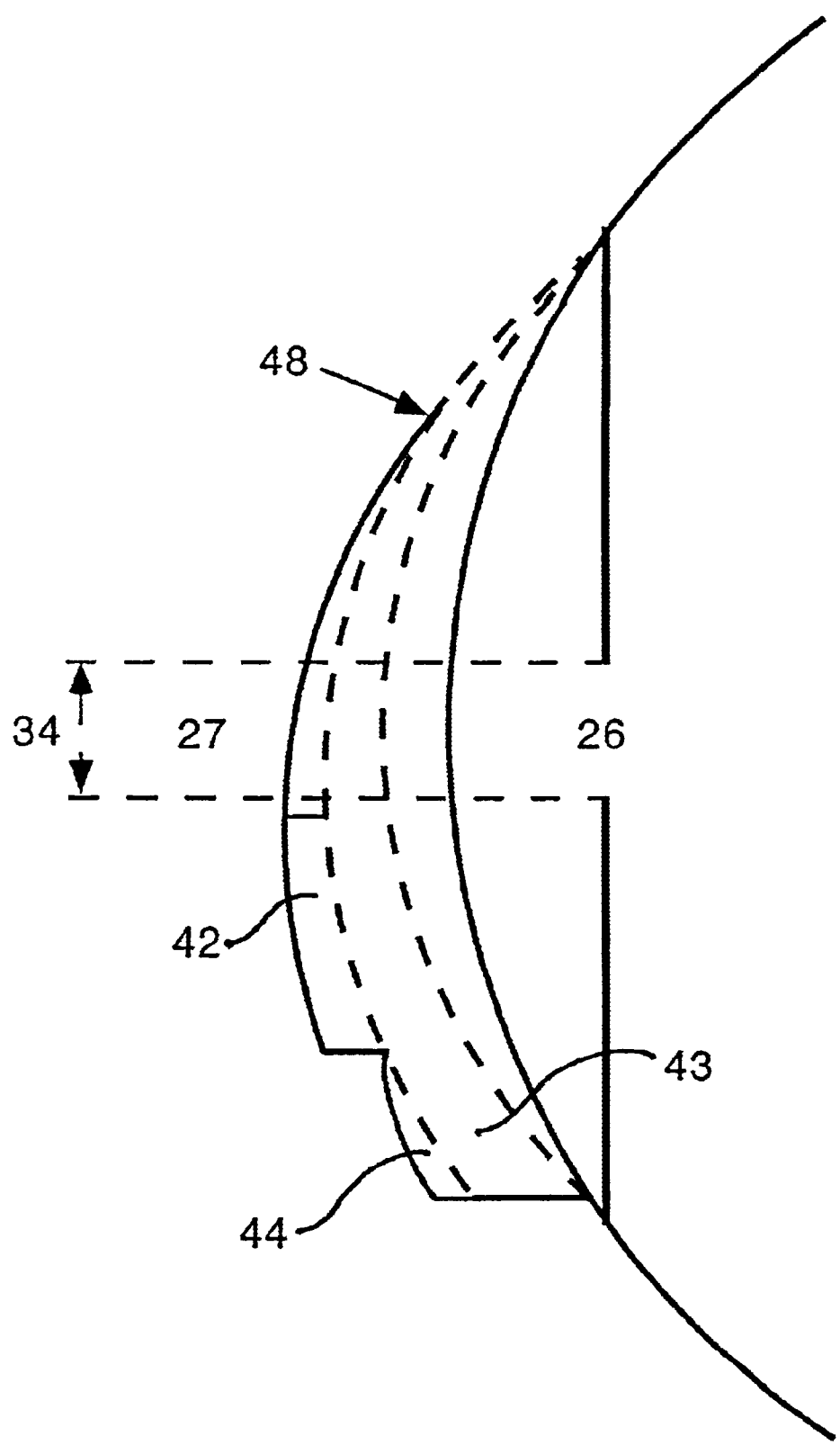
FIG. 6 is a cross-sectional view of a bifocal contact lens in accordance with my invention, which has a second primary prism of reduced prism power.

FIG. 6 is a cross-sectional view of a bifocal contact lens 48, in accordance with my invention, in which there are two primary prisms and one secondary prism 44. Primary prism 42 has the same function as described and primary prism 43 has the function of increasing the primary prism effect on lens positioning and meridional rotation while maintaining a reduced center thickness of the contact lens. Two or more primary prisms achieve greater friction between the contact lens and the inner surface of the lid, so as to enhance lens positioning.

Figure 7:
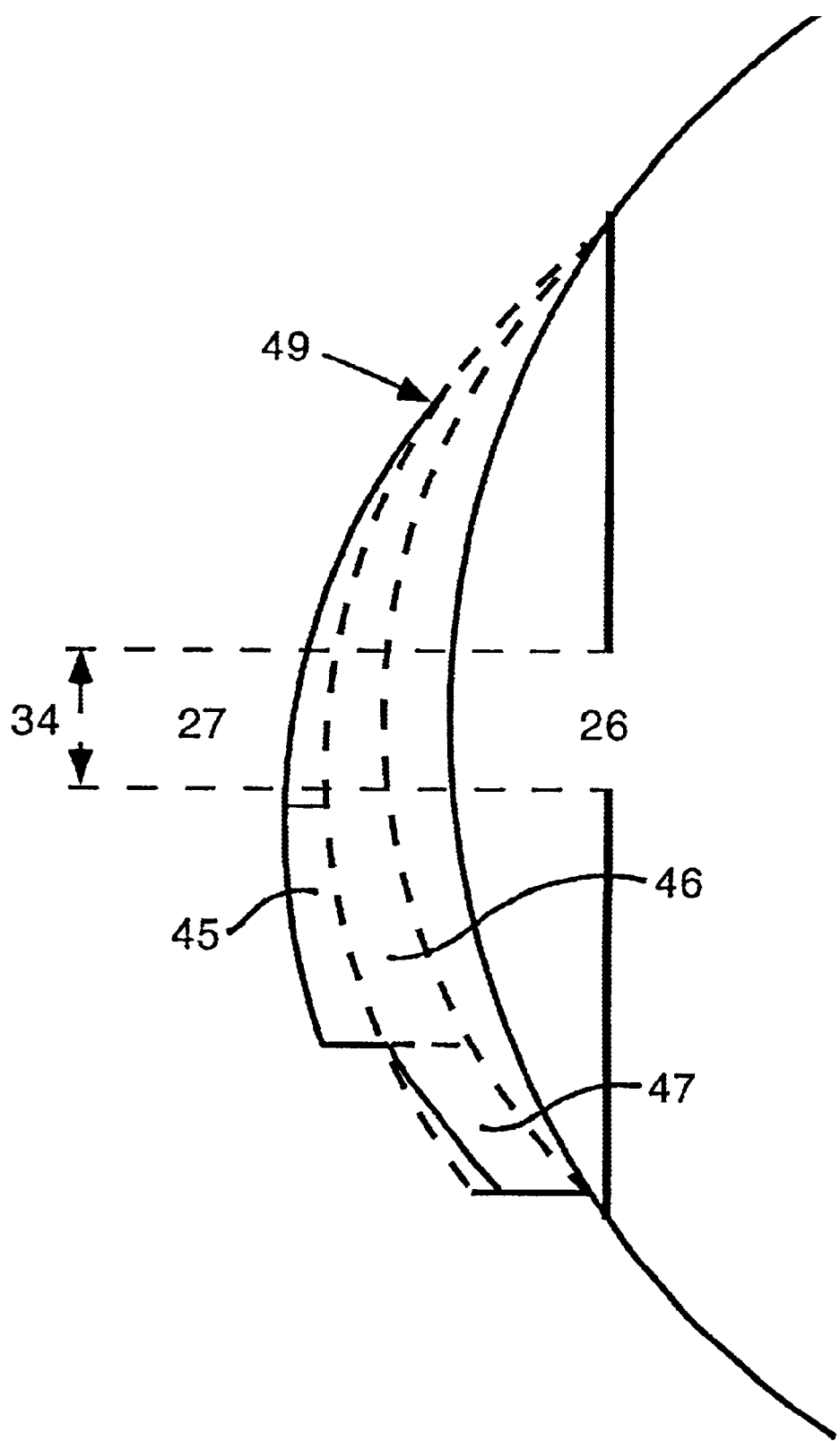
FIG. 7 is a cross-sectional view of a bifocal contact lens in accordance with my invention, which has a second primary prism of reduced prism power.

FIG. 7 is a cross-sectional view of a bifocal contact lens 49, in accordance with my invention, in which there are two primary prisms and a secondary prism 45. A primary prism 46 has the same function as described and a second primary prism 47 has the function of reducing contact with the lower lid and improving comfort of the contact lens.

Figure 8:
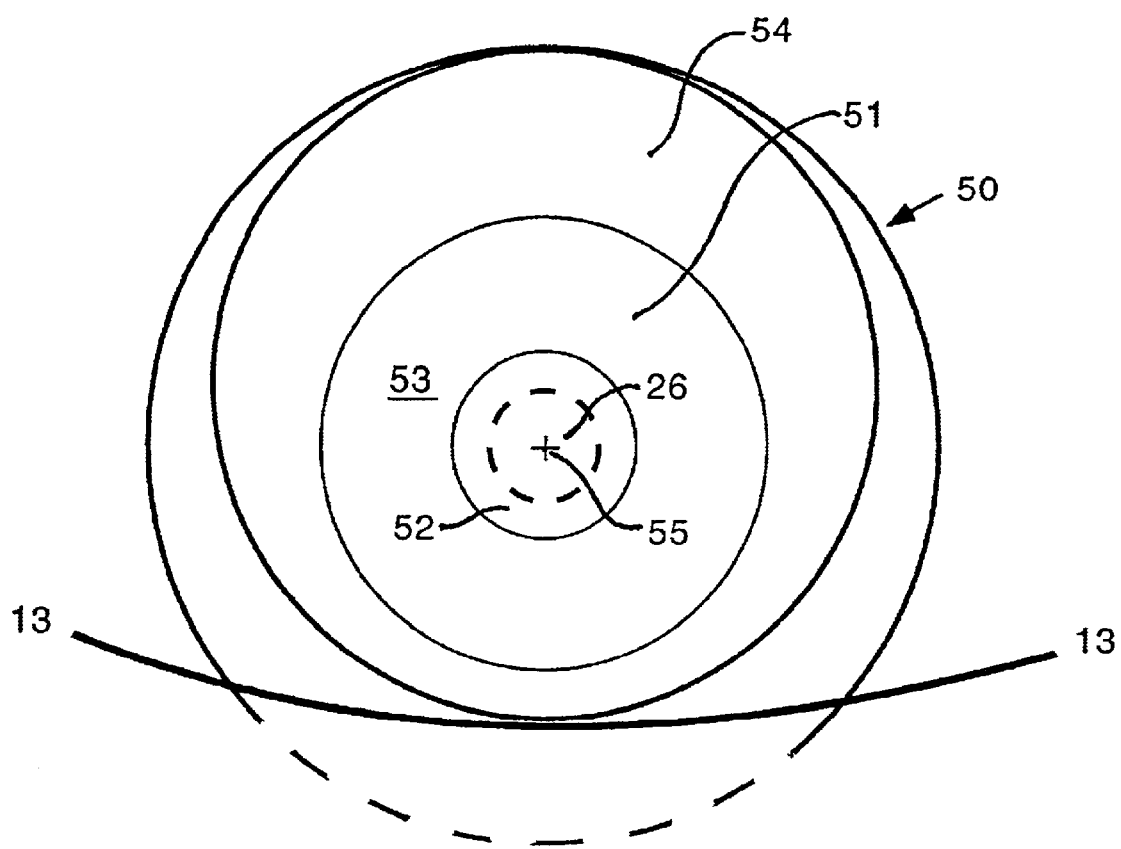
FIG. 8 is a front plan view of a bifocal contact lens in accordance with my invention, which has a bifocal area with concentric zones and a secondary prism that is decentered upward.

FIG. 8 is a plan view of a bifocal contact lens 50 in accordance with my invention for which a bifocal area 51 has a central far-power zone 52 and a concentric near-power zone 53, centered on entrance pupil 26. A secondary prism 54 is decentered upward from geometric center 55 of lens 50. In this embodiment of my invention in which far-power zone 52 of lens 50 is in a central position and surrounded concentrically by near-power zone 53, the dimensions are chosen such that lens shifting is not so great as to place the upper portion of the near-power zone in front of the entrance pupil at the time of desired distance vision. The advantage of this construction is that some meridional rotation of the lens can occur during the wearers downward gaze and entrance pupil 26 will still be covered by part of near-power zone 53 of the lens. In addition, by an appropriate choice of zone dimensions, the wearer may be able to view near objects clearly that are located at a high position above the level of distance vision, when the entrance pupil is covered by the upper part of near-power zone 53.

Figure 9A:
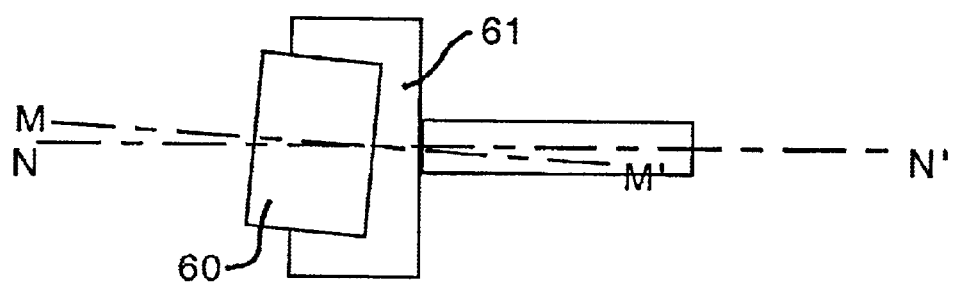
Figure 9B:
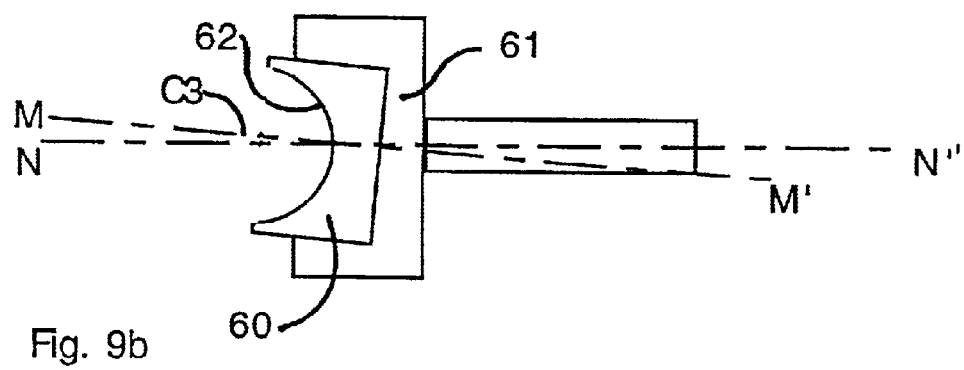
Figure 9C:
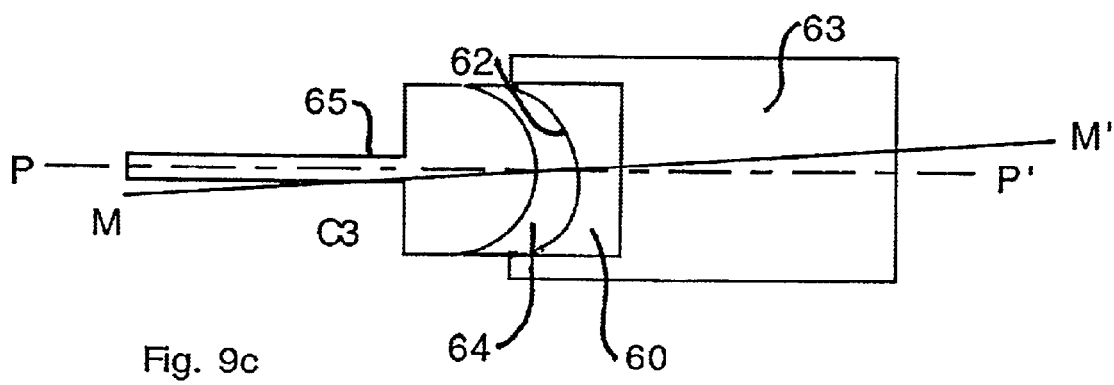
Figure 9D:
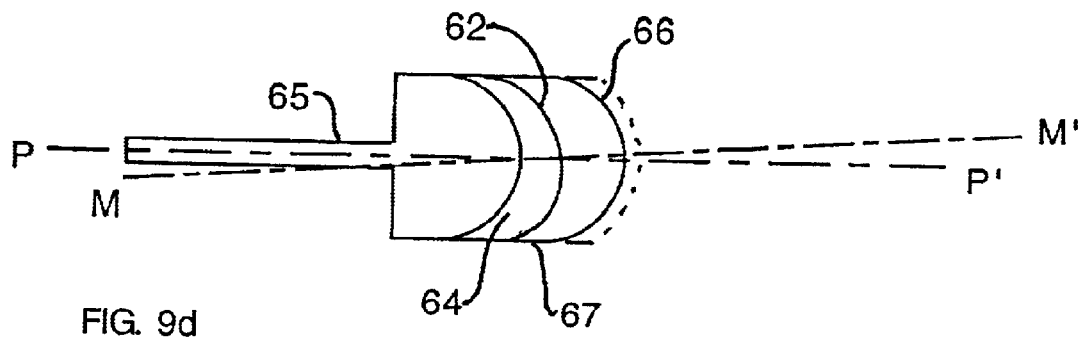
Figure 9E:
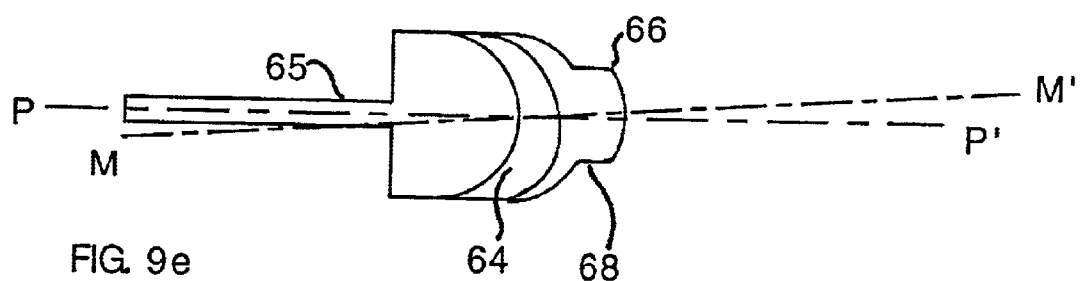
Figure 9F:
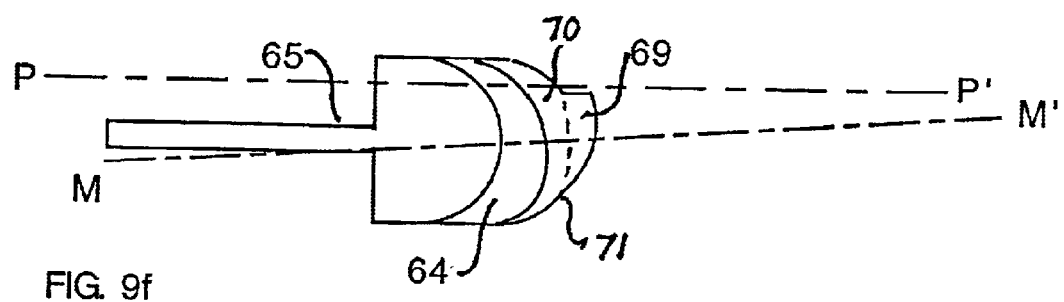

FIGS. 9a to 9f illustrates a method for making a bifocal contact lens 70, in accordance with my invention, which consists of a lathing process. FIG. 9a shows a standard button 60 of soft contact lens material in unhydrated form and having center line MM', which is placed in a collet 61 that tilts button 60 a predetermined amount with respect to center axis NN' of collet 61. In FIG. 9b a concave base curve 62 with center of curvature C3 is generated along with other curves that may be desired for fitting purposes using methods known to those familiar with the state of the art and not illustrated. Modified button 60 is then removed and mounted as shown in FIG. 9c onto a blocking tool 63 in such a way that center of curvature C3 of base curve 62 is offset from the center line PP' of arbor 65. Base curve 62 of modified button 60 is blocked to arbor 65 by a layer of pitch 64 or other similar materials. Arbor 65 is placed in a lathe collet for generating the front surface in a process requiring several steps. In step one shown in FIG. 9d, a series of cuts are made across the entire button until intersecting the most forward point 66 of the base of secondary prism 69 of the lens using a radius that is greater than the radius of the lenticular portion of the lens. In step 2, FIG. 9e, a series of cuts are made from the edge of the button 67 inward using a radius of the lenticular area of the lens, stopping at the position of the perimeter 68 of the secondary prism. This results in a front surface in the shape of a hat. In step 3, FIG. 9f, modified button 60 is removed from arbor 65 and reblocked in offset manner along axis PP' such that a curve is cut from the base of the hat point 66 to the point 71 of the opposite side where it is contiguous with the lenticular portion of lens 70. The lathe can now be used to generate any bifocal shape by methods known to those familiar with the state of the art, which will be oriented at a angle that creates a secondary prism 69 of the desired prism power. Lens 70 can then be removed and hydrated to the final form.

An alternative method to the step process described for the lathing of my invention is to first calculate a points file in suitable form to be read by a computer-controlled multiaxis lathe. The points file can then be used to generate a front surface by using a series of cuts in the manner described.

Another alternative method for the manufacture of my invention is to first prepare a mold ether by direct lathing or molding lens surfaces o f the desired shapes. The molds may then be used to form a contact lens of any suitable material.

There are a number of general considerations that apply to my invention.

The surface of the power zones may be comprised of spherical, toric, or aspherical curvatures. There may be one or more transition curves between the distance and near-power zones.

The meridional orientation of a prism may be defined by a line along its greatest constant thickness, representing the base, or alternatively by a perpendicular to the base that passes through the apex, the thinnest portion of the prism. This perpendicular constitutes the base-apex axis.

When the lens of my invention is worn on the eye the thickest portion of the primary prism is located at a substantially downward position and the base-apex axis of the primary prism is oriented approximately vertically. The base-apex axis of the secondary prism is usually constructed in the same direction as the base-apex axis of the primary prism but may be at a predetermined angle to better fit an eye.

Prism that is incorporated into my contact lens invention is represented by a difference in thickness across the lens that occurs in addition to the thickness variation created by the optical power component of the lens used to correct refractive error. This prism thickness change across the lens is usually linear along the base-apex axis but may have a non-linear progression or discontinuities.

The secondary prism of my invention is constructed such that the base of the prism is located in a substantially downward position on the eye so that the base touches or nearly touches the lower lid. The critical feature of the secondary prism is that its base extends forward from the adjacent surface. The lens thickness at the apex of the secondary prism is equal or nearly equal to the thickness of the upper adjacent area of the lens. When the wearer views a distant object, the base of the secondary prism is in contact or near contact with the lower lid whereas the lower region of the lens containing part of the primary prism lies beneath the lower lid. When the wearer looks downward the base of the secondary prism is held in position by the margin of the lower lid so that the lens moves upward relative to the eye. In this manner the lens is shifted so that the entrance pupil of the eye is behind the far-power zone of the contact lens for distance vision and behind the near-power zone of the contact lens for near vision. The portion of the lens that is near the upper edge is thin and flexible so that it moves easily over the cornea and sclera with minimal resistance.

The base of the secondary prism may be tilted, flattened or otherwise shaped to more closely conform to the shape of the margin of the lower lid. It is not necessary that the entire secondary prism extend forward from the adjacent surface in order to accomplish lens shifting, providing there is sufficient base to make contact with the lower lid margin.

Various amounts of primary prism may be required as well as various amounts of secondary prism in order to fit the characteristics of different eye and lid positions. Frequently, about one prism diopter will function well for the primary prism power and about one and one half prism diopters for the secondary prism power but larger or smaller amounts of prism may be required for different lens parameter values and to fulfill the needs of individual eyes.

The function of two or more secondary prisms is to compensate for different eye dimensions, one of the prisms likely being in the optimal position to make contact with the lower lid.

The back surface of the bifocal contact lens of my invention is designed in a manner so as to fit the cornea of the wearer using methods known to those familiar with the state of the art. Generally, the curvature of the back surface of the contact lens is made very similar to the curvature of the cornea. However, there are purposeful differences made in the lens curvatures from the corneal curvatures, which are governed by the shape of the cornea, the shape of the contact lens and the interrelationship that is desired by the fitter in order to control the lens riding position on the cornea and the lens movement.

The bifocal lens of my invention may have lenticular curves, slab off, edge tapers or truncations as are commonly found in present contact lenses as well as oval or other commonly known perimeter shapes.

The principles that are described here for my invention may be applied to contact lenses made of any optical material, hard, flexible, soft, hydrophobic or hydrophilic, that is suitable for a contact lens. However I have found that this lens design is best suited for what are generally known as soft or flexible contact lens materials.

I claim:

1. A bifocal contact lens formed of at least one optical material and comprising, a back surface of generally concave shape, a front surface of generally convex shape, said front surface joining said back surface at an edge perimeter, said contact lens comprising a primary prism that affects positioning and rotation of said contact lens, said front surface comprising a secondary prism that is located centrally and a lenticular area that is located peripherally, said secondary prism comprising a base that extends in an external direction from the portion of said lenticular area that is contiguous with said base of said secondary prism, said secondary prism area comprising prism power and correction for refractive error, whereby in wearing said contact lens on said eye, a portion of said lenticular area occupies a position beneath the lower lid of said eye, and said base of said secondary prism occupies a position approximately at the margin of said lower lid, so that generally vertical movements of said lens are imparted as a result of forces from said lower lid to said base, during generally vertical movements of said eye.

2. The bifocal contact lens of claim 1 wherein said base of said secondary prism extends in an external direction in part and an internal direction in part from the portion of said lenticular area that is contiguous with said base of said secondary prism.

3. The bifocal contact lens of claim 1 wherein said base of said secondary prism has a shape selected from the class consisting of circular, non-circular, tilted, flat, and angled shapes.

4. The bifocal contact lens of claim 1 wherein at least one portion of said lenticular area is comprised of slab off.

5. The bifocal contact lens of claim 1 wherein at least one surface of said contact lens is selected from the class consisting of spherical, aspherical, and toric shapes.

6. The bifocal contact lens of claim 1, further including a second primary prism.

7. The bifocal contact lens of claim 1, further including a second secondary prism.

8. A contact lens formed of at least one optical material and comprising, a back surface of generally concave shape, a front surface of generally convex shape, said front surface joining said back surface at an edge perimeter, said contact lens comprising a thickness difference across said contact lens for (a) correcting refractive error, (b) controlling vertical positioning of said contact lens on an eye, and (c) controlling meridional rotation of said contact lens in the general plane of the corneal limbus of said eye, said front surface comprising a prism that is located centrally and a lenticular area that is located peripherally, said prism comprising a base that extends in an external direction from the portion of said lenticular area that is contiguous with said base of said prism, said prism area comprising prism power and correction for refractive error, whereby in wearing said contact lens on said eye, a portion of said lenticular area occupies a position beneath the lower lid of said eye, and said base of said prism occupies a position approximately at the margin of said lower lid, so that generally vertical movements of said lens are imparted as a result of forces from said lower lid to said base, during generally vertical movements of said eye.

9. The contact lens of claim 8 wherein said base of said prism extends in an external direction in part and an internal direction in part from the portion of said lenticular area that is contiguous with said base of said prism.

10. The contact lens of claim 8 wherein said base of said prism has a shape selected from the class consisting of circular, non-circular, tilted, flat, and angled shapes.

11. The contact lens of claim 8 wherein at least one portion of said lenticular area is comprised of slab off.

12. The contact lens of claim 8 wherein at least one surface is selected from the class consisting of spherical, aspherical, and toric shapes.

13. A method of manufacturing a contact lens comprising, providing a lens button of optical material, using a lathe having an axis of rotation for generating;
- (a) a back surface of predetermined radius on said lens button, said back surface comprising a center of curvature that lies on said axis of said lathe,
- (b) a front surface on said lens button, said front surface comprising a lenticular area having a peripheral location, a predetermined radius, and a center of curvature which is offset a predetermined amount from said axis of said lathe, forming a primary prism,
- (c) a secondary prism on said front surface of said contact lens, said front surface having a central location, and comprising a predetermined radius and a center of curvature that is offset from said axis of said lathe by a predetermined amount that is greater than said offset of said lenticular area, so as to produce a base for said secondary prism that extends in an external direction from the portion of said secondary prism that is contiguous with said lenticular area,
- (d) tapers, slab-off and rounding needed to form a smoothly curved edge.

14. The method of manufacturing said contact lens of claim 13 wherein said lathe is equipped with a computer controller and in which a points file representing said front surface and said back surface of said contact lens is read by said computer and used to generate said contact lens.

15. The method of manufacturing said contact lens of claim 13, by lathing said contact lens, forming a plurality of molds shaped as negative impressions of said front surface and said back surface of said contact lens, and from said molds producing a duplicate of said contact lens by a process of molding.

16. The method of manufacturing said contact lens of claim 13, by lathing negative representations of said front surface and said back surface, to produce molds which may be used to form said contact lens.

\* \* \* \* \*